United States Patent [19]

Niwa et al.

[11] Patent Number: 4,727,771
[45] Date of Patent: Mar. 1, 1988

[54] METHOD FOR CONTROLLIG A CONTROLLING A CONTINUOUSLY VARIABLE TRANSMISSION

[75] Inventors: Takao Niwa; Takeshi Gono; Akinori Osanai, all of Susono, Japan

[73] Assignee: Toyota Jidosha Kabushiki Kaisha, Aichi, Japan

[21] Appl. No.: 57,641

[22] Filed: Jun. 8, 1987

Related U.S. Application Data

[63] Continuation of Ser. No. 607,139, May 4, 1984, abandoned.

[30] Foreign Application Priority Data

May 9, 1983 [JP] Japan .................................. 58-79306

[51] Int. Cl.$^4$ .............................................. B60K 41/12
[52] U.S. Cl. ............................................ 74/866; 74/861
[58] Field of Search ................. 74/877, 866, 865, 861; 364/424.1; 474/12, 18

[56] References Cited

U.S. PATENT DOCUMENTS

| | | | |
|---|---|---|---|
| 4,387,608 | 6/1983 | Mohl et al. | 474/18 X |
| 4,458,318 | 7/1984 | Smit et al. | 474/12 X |
| 4,458,561 | 7/1984 | Frank | 74/865 |
| 4,470,117 | 9/1984 | Miki et al. | 74/866 X |
| 4,475,416 | 10/1984 | Underwood | 474/12 X |
| 4,501,171 | 2/1985 | Muller et al. | 74/866 |
| 4,505,169 | 3/1985 | Eanoung | 74/866 X |
| 4,507,986 | 4/1985 | Okamura et al. | 74/866 |
| 4,509,125 | 4/1985 | Fattic et al. | 474/18 X |
| 4,515,040 | 5/1985 | Takeuchi et al. | 74/866 |
| 4,551,802 | 11/1985 | Smyth | 74/866 X |

Primary Examiner—Leslie Braus
Assistant Examiner—David Novais
Attorney, Agent, or Firm—Parkhurst & Oliff

[57] ABSTRACT

A method for controlling a continuously variable transmission installed in a vehicle. The method utilizes a changing rate for varying a RPM ratio between an output shaft and an input shaft to compensate for large and small throttle openings as well as varying rates of changing the throttle opening.

5 Claims, 11 Drawing Figures

METHOD FOR CONTROLLIG A CONTROLLING A CONTINUOUSLY VARIABLE TRANSMISSION

This is a continuation of application Ser. No. 607,139, filed May 4, 1984 and now abandoned.

BACKGROUND OF THE INVENTION

The present invention relates to a method for controlling a continuously variable transmission installed in a vehicle, and more particularly to a method for controlling a rate ė of changing a RPM ratio between a driving pulley and a driven pulley in a continuously variable transmission.

A major factor influencing the use of a continuously variable transmission in a vehicle is to decrease the amount of fuel consumed by the engine. The continuously variable transmission continuously varies a transmission RPM ratio "e" between a driving pulley and a driven pulley, i.e. [e=(a rotating speed of an output shaft)/(a rotating speed of an input shaft), $RPM_{out}/RPM_{in}$]. The transmission efficiency of a continuously variable transmission can be represented as a linearly declining function of the rate of changing the RPM ratio e, represented by ė. The rate ė of changing the RPM ratio is always referred to as a positive quantity, for example, the absolute value of the rate of change is referred to as $|ė|$ or $|de/dt|$.

Previous attempts to control the rate ė of changing the transmission RPM ratio have involved utilizing a fixed rate ėf of changing the transmission ratio, which was completely independent of the amount that a throttle valve was opened ($\theta$) or the rate that the throttle valve was opening or closing, i.e. $|d\theta/dt|$. Therefore, if the rate ė of changing the transmission RPM ratio was fixed at a high value, whenever rapid acceleration of the vehicle was required, the transmission could rapidly respond. However, a large amount of fuel was consumed whenever the vehicle was exposed to steady state driving conditions or when required to slowly accelerate. Conversely, if the rate ė of changing the transmission RPM ratio was fixed at a small value, only a small amount of fuel was consumed whenever the vehicle was exposed to steady state driving conditions or when slowly accelerating. However, the transmission could not rapidly respond when a rapid acceleration of the vehicle was required.

SUMMARY OF THE INVENTION

The present invention was made in view of the foregoing background and to overcome the foregoing drawbacks. It is accordingly an object of this invention to provide a method for controlling a continuously variable transmission which provides for an increased amount of fuel whenever rapid acceleration is required and causes a rate ė of changing the transmission ratio to increase. Additionally, the method of control provides for lesser amounts of fuel consumption when the vehicle is subjected to steady state conditions or when the vehicle is accelerating slowly.

To attain the above objects, a method for controlling a continuously variable transmission having a driving pulley, a driven pulley and a continuous belt member spanning the pulleys includes utilizing a changing rate ė of varying a RPM ratio e between the driven pulley and the driving pulley in accordance with a detected amount of throttle opening $\theta$ in a throttle valve or rate $d\theta/dt$ that the throttle valve is opening or closing.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
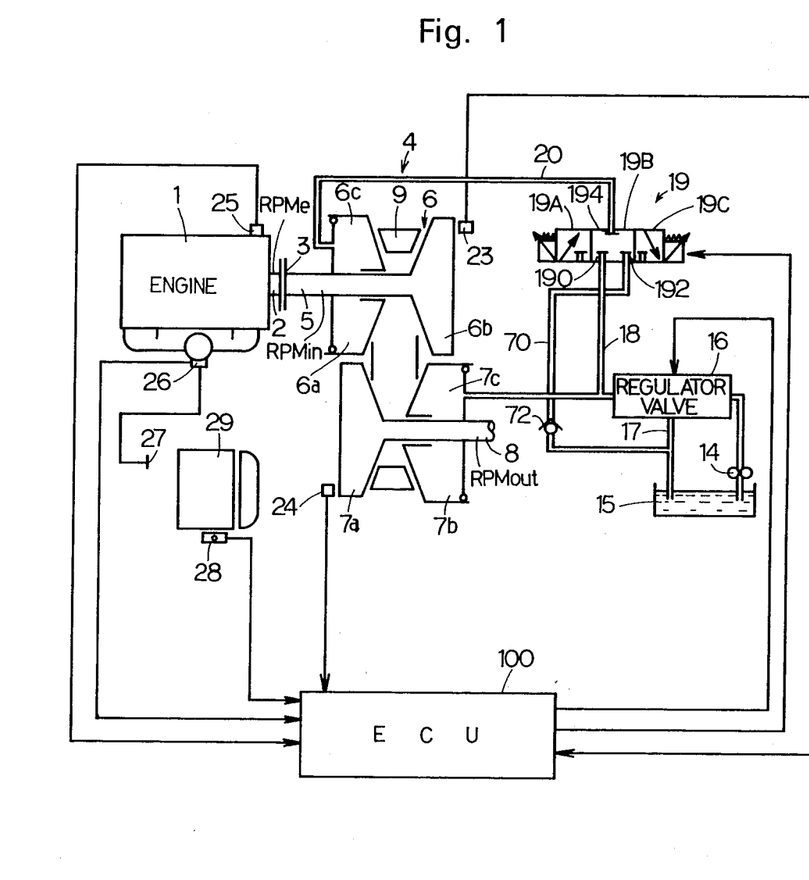
FIG. 1 is a schematic view of a hydraulic apparatus utilizing the method of the present invention.

FIG. 1 illustrates a schematic view of a hydraulic apparatus which employs the method according to the present invention. An engine 1 is operably connected by a crank shaft 2 through a clutch 3 with an input shaft 5. The input shaft 5 is connected with a continuously variable transmission 4 (hereinafter referred to as CVT). The CVT 4 includes pulleys 6 and 7. The pulley 6 is a driving pulley mounted on the driving and input shaft 5, which is driven by the engine 1. The pulley 7 is a driven pulley, mounted on a driven and output shaft 8. The torque of the shaft 8 is outputted to wheels of a vehicle (not shown in drawings). A torque transmitting continuous V-belt 9 extends between the pulleys 6 and 7. The driving pulley 6 has a movable member 6a, which is axially displaced on and rotatable with the input shaft 5, and a fixed member 6b, which is fixed to and rotatable with the input shaft 5. The movable member 6a is axially displaced upon the input shaft 5 by the pressure exerted upon it by a hydraulic cylinder 6c. When the movable member 6a is axially displaced in a direction toward the fixed member 6b, the width defined between the members 6a and 6b is decreased. This results in an increased effective diameter of the driving pulley 6. As a result, the transmission RPM ratio "e", i.e., (the rotating speed of the driven pulley 7)/(the rotating speed of the driving pulley 6), $RPM_{out}/RPM_{in}$) is increased. The $RPM_{in}$ is governed by the engine RPM, represented by $RPM_e$.

Similarly, the driven pulley 7 has a movable member 7b, which is axially displaced on and rotatable with the output shaft 8, and a fixed member 7a, which is fixed to and rotatable with the output shaft 8. The movable member 7b is axially displaced upon the output shaft 8 by the pressure exerted upon it by a hydraulic cylinder 7c. When the movable member 7b is axially displaced in a direction toward the fixed member 7a, the width defined between the members 7a and 7b is decreased. This results in an increased effective diameter of the driven pulley 7.

In order to minimize the amount of engine power consumed by a hydraulic fluid pump 14, the hydraulic pressure in the hydraulic cylinder 7c is controlled to be as small as possible while maintaining a necessary pressure to prevent the belt 9 from slipping while rotating around the driving pulley 6 and the driven pulley 7. The hydraulic pressure in the hydraulic cylinder 6c is varied to adjust the RPM ratio e. The amount of pressure in the hydraulic cylinder 6c is designed to be smaller than that of the hydraulic pressure in the hydraulic cylinder 7c. However, even though the value of the hydraulic pressure supplied to the hydraulic cylinder 6c is less than the value of the hydraulic pressure supplied to the hydraulic cylinder 7c, the system is designed so that a greater overall hydraulic pressure is realized in the hydraulic cylinder 7c than in the hydraulic cylinder 6c, because the cylinder 6c has a larger area acted upon by the hydraulic pressure than that of the hydraulic cylinder 7c. Hence, it is possible to obtain a RPM ratio of greater than, or at least equal to, one.

The CVT 4 is supplied with hydraulic fluid by the following procedure. A hydraulic fluid pump 14, driven by a motor, pumps hydraulic fluid from a reservoir 15 to a regulator valve 16. The regulator valve 16 controls the pressure supplied to an oil passage 18 by adjusting an amount of fluid drained from the system, whereby generating a specific line pressure $P_L$ in the hydraulic fluid passage 18. The regulator valve 16 supplies the line pressure $P_L$ through the passage 18 to the hydraulic cylinder 7c of the driven pulley 7 and to a flow control valve 19. The flow control valve 19 is a three port connection valve, and includes an inlet port 190 communicated with the passage 18, a drain port 192 communicated with a drain passage 70 and an outlet port 194 communicated through a hydraulic fluid passage 20 with the hydraulic cylinder 6c of the driving pulley 6. When the flow control valve 19 is in a first position 19A, the inlet port 190 communicates with the outlet port 194. When the flow control valve 19 is in a second position, shown by 19B, there is no communication between the three ports 190, 192 and 194 as shown in FIG. 1. Finally, when the flow control valve 19 is in a third position 19c, the outlet port 194 communicates with the drain port 192. A check valve 72 is provided on the drain passage 70. The check valve 72 only allows hydraulic fluid to flow in a single direction, from the control valve 19 to the hydraulic fluid reservoir 15.

A sensor 23 detects the rotational speed $RPM_{in}$ of the driving pulley 6. A sensor 24 detects the rotational speed $RPM_{out}$ of the driven pulley 7. An engine coolant temperature sensor 25 is mounted adjacent a cylinder block of the engine 1 and detects the temperature of the engine coolant. A throttle opening sensor 26 detects an amount that a throttle valve is opened, which is varied in proportion to a stroke of an accelerator pedal 27, installed adjacent to a passenger seat 29. A sensor 28, mounted near the passenger seat 29, detects the position of a shift lever of the transmission. In the case of an automatic transmission, the sensor 28 detects the shift range of the transmission.

The signals detected by the foregoing sensors are inputted to an electronic control unit 100 (hereinafter referred to as ECU). The ECU 100 outputs control signals to the regulator valve 16 and the flow control valve 19.

When the hydraulic pressure in the hydraulic cylinder 7c of the movable member 7b of the driven pulley 7 increases, the movable member 7b is axially displaced upon the output shaft 8 toward the fixed member 7a. This axial displacement results in contact points between the driven pulley 7 and the belt 9 moving toward points which are positioned toward outer peripheral portions on the driven pulley 7. The amount of the line pressure $P_L$ is controlled so that it does not result in any significant amount of slip between the belt 9 and the driven pulley 7. When the hydraulic pressure in the hydraulic cylinder 6c of the driving pulley 6 increases, the movable member 6a of the driving pulley 6 is axially displaced upon the input shaft 5 toward the opposite member 6b. This axial displacement similarly results in contact points between the driving pulley 6 and the belt 9 moving toward points which are positioned toward outer peripheral portions on the driving pulley 6. Thus, the transmission RPM ratios between the driving and driven pulleys are controlled.

Figure 2:
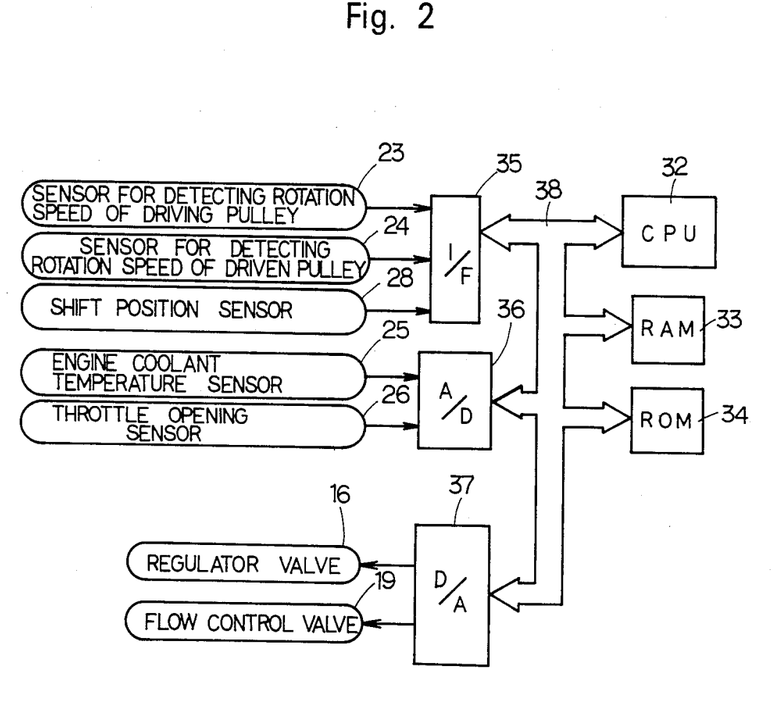
FIG. 2 is a circuit diagram of an electronic control unit employed in the present invention.

The ECU 100 controls the regulator valve 16 and the flow control valve 19 in accordance with the signals detected by the various sensors. FIG. 2 shows that the ECU 100 functions as a digital computer and has a central processing unit 32 (hereinafter referred to as CPU) which carries out arithmetic and logic processing functions, an inter-face 35 (hereinafter referred to as I/F), an analog-digital converter 36 (hereinafter referred to as A/D), a random-access memory 33 (hereinafter referred to as RAM) which temporarily stores the calculated data of the CPU 32, a read-only memory 34 (hereinafter referred to as ROM) which stores a predetermined control program and arithmetic constants therein, and a digital-analog converter 37 (hereinafter referred to as D/A). They are connected by a common bus 38. An example of how the ECU 100 functions is given by the following. The I/F 35 receives an output signal from the sensor 23 corresponding to a rotational speed of the driving pulley 6 ($RPM_{in}$), an output signal from the sensor 24 corresponding to a rotational speed of the driven pulley 7 ($RPM_{out}$), and an output from the shift position sensor 28. The A/D 36 receives output signals from the engine coolant temperature sensor 25 and the throttle opening sensor 26. The CPU 32, a microprocessor, then compares the outputs received against any stored information, and issues an output to the D/A 37, which then subsequently outputs any appropriate instructions to the regulator valve 16 and the flow control valve 19.

The ROM memory means 34 works in conjunction with the CPU data processing means 32 in the following manner: The ROM 34 stores a data map which includes data relating to a rate $\dot{e}$ of changing a RPM ratio and data relating to an amount $\theta$ of throttle opening and rate $\Delta\theta/\Delta t$ of changing throttle opening or closing. The CPU data processing means 32 compares the actual operating conditions to the data stored in the ROM 34, and if appropriate, outputs signals which result in the regulator valve 16 and the flow control value 19 being controlled.

Figure 3:
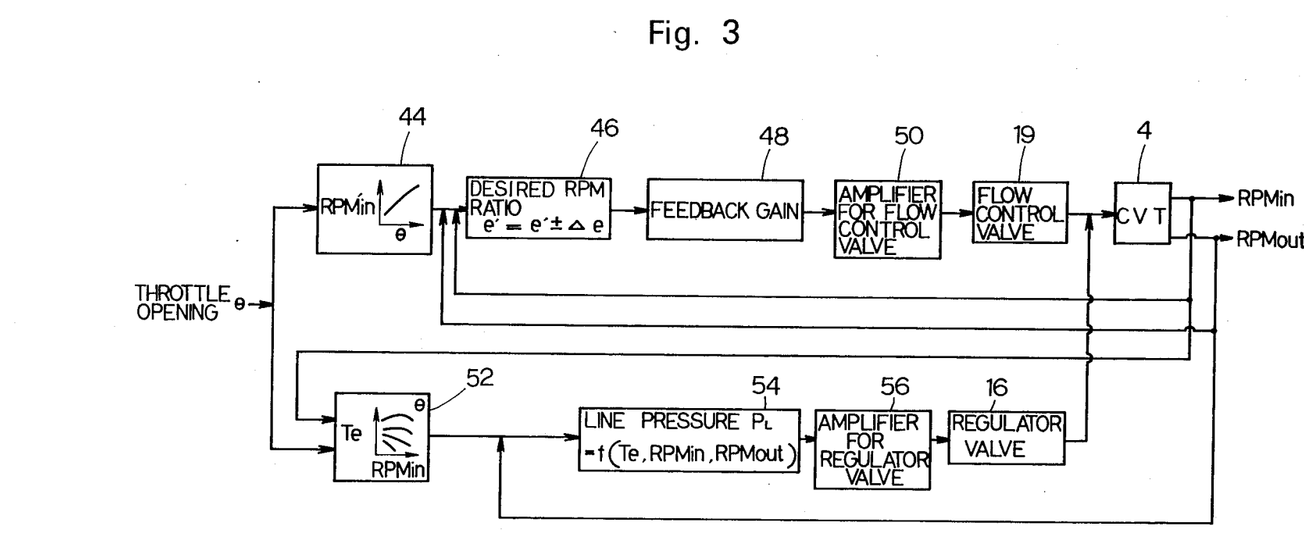
FIG. 3 is a block diagram showing a method for controlling a continuously variable transmission.

FIG. 3 is a block diagram illustrating a method for controlling the CVT 4. In a block 44, a desired rotational speed $RPM'_{in}$ of the driving pulley 6 is calculated in accordance with a detected throttle opening $\theta$. The requisite horsepower in the engine 1 is a function of the throttle opening $\theta$ and the desired engine rotational speed $RPM'_e$ is determined to have a valve corresponding to a minimum amount of fuel consumption when the requisite horsepower for the engine 1 has been determined. The program proceeds to a block 46, wherein a compensated desired RPM ratio $e_c'$, is calculated by adding a selected value $+\Delta e$ or $-\Delta e$ to the desired RPM ratio $e'$ until the actual rotational speed $RPM_{in}$, of the driving pulley 6 approaches the desired rotational speed, $RPM'_{in}$, calculated in accordance with the detected throttle opening $\theta$. When the actual rotational speed $RPM_{in}$ of the driving pulley 6 is less than the desired rotational speed $RPM'_{in}$, a negative value $-\Delta e$ is selected as a compensating amount. However, when the actual rotational speed $RPM_{in}$ of the driving pulley 6 is greater than the desired rotational speed $RPM'_{in}$, a positive value $+\Delta e$ is selected as a compensating amount. Additionally, when the actual rotating speed $RPM_{in}$ of the driving pulley 6 is equal to the desired rotating speed $RPM'_{in}$, no compensating amount is added or subtracted. After adjusting the actual rotational speed $RPM_{in}$, the program proceeds to a block 48, wherein a feedback gain is calculated from the difference between the compensated desired RPM ratio $e_c'$ and actual RPM ratio $e$. The feedback gain is transmitted through an amplifier 50 to the flow control valve 19. Thus, the actual RPM ratio $e$ is controlled.

In a block 52, an engine torque $T_e$ is determined by examining the rotational speed of the driving pulley 6, $RPM_{in}$, as controlled by the flow control valve 19, and the throttle opening $\theta$. The program then proceeds to a block 54. In the block 54, a line pressure $P_L$ is calculated as a function of a transmitting torque of the CVT 4. The transmitting torque of the CVT 4 is a function of the engine torque $T_e$, the rotational speed $RPM_{in}$ of the driving pulley 6 and the rotational speed $RPM_{out}$ of the driven pulley 7. The output signal of the block 54 is inputted through an amplifier 56 to the regulator valve 16. The regulator valve 16 controls the line pressure $P_L$ supplied into the hydraulic cylinder 7c of the driven pulley 7, as well as the line pressure supplied to the flow control valve 19, thus controlling the effective diameter of the driven pulley 7.

Figure 4:
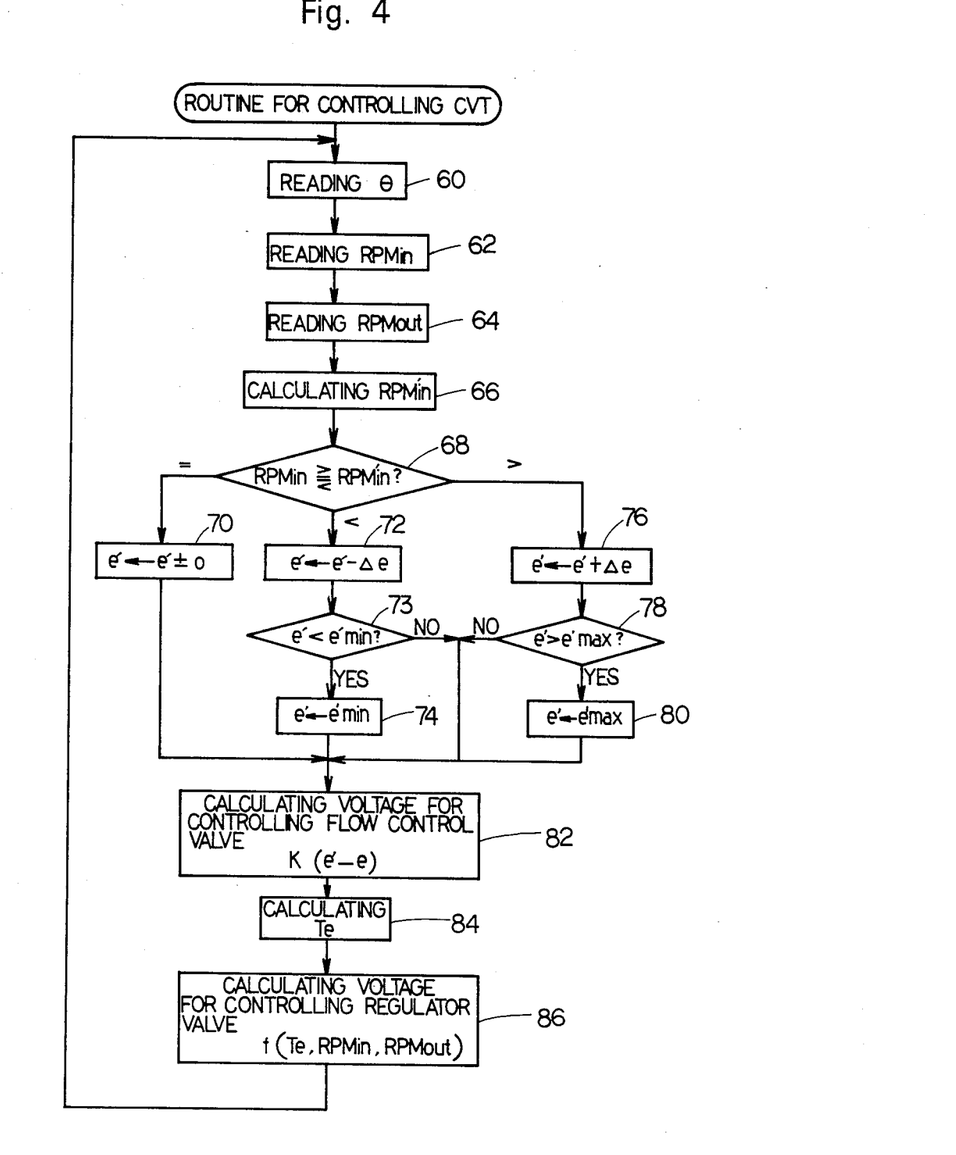
FIG. 4 is a flow chart which corresponds to the block diagram shown in FIG. 3.

FIG. 4 shows a flow chart of the routine employed in the block diagram shown in FIG. 3. In a step 60, the throttle opening $\theta$ is read. The program proceeds to a step 62, wherein the rotational speed $RPM_{in}$ of the driving pulley 6 is read. The program proceeds to a step 64, wherein the rotational speed $RPM_{out}$ of the driven pulley 7 is read. The program proceeds to a step 66, wherein the desired rotational speed $RPM'_{in}$ of the driving pulley 6 is calculated. The program then proceeds to a step 68. In the step 68, the determination is made of whether the rotational speed of the driving pulley 6, $RPM_{in}$, is greater than, less than or equal to the desired rotational speed $RPM'_{in}$, of the driving pulley 6. When the rotational speed $RPM_{in}$ of the driving pulley 6 is equal to the desired rotational speed $RPM'_{in}$, the program proceeds to a step 70. In the step 70, the desired RPM ratio $e'$ is not adjusted. When the rotational speed $RPM_{in}$ of the driving pulley 6 is less than the desired rotational speed $RPM'_{in}$, the program proceeds to a step 72. In the step 72, the compensated desired RPM rato $e_c'$ is calculated by adding the selected value $-\Delta e$ to the desired RPM ratio $e'$. The program then proceeds to a step 73, wherein the determination is made of whether the compensated desired RPM ratio $e_c'$ is less than a predetermined minimum desired RPM ratio $e'min$. If the compensated desired RPM ratio $e_c'$ is less than the minimum desired RPM ratio $e'min$, then the program proceeds to the step 74, wherein the compensated desired RPM ratio $e_c'$ is set equal to the minimum desired RPM ratio $e'min$. However, when the rotational speed $RPM_{in}$ of the driving pulley is greater than the desired rotating speed $RPM'_{in}$, the program proceeds to a step 76. In the step 76, the compensated desired RPM ratio $e_c'$ is calculated by adding the selected value $+\Delta e$ to the desired RPM ratio $e'$. The program then proceeds to a step 78, wherein the determination is made of whether the compensated desired RPM ratio $e_c'$ is greater than a predetermined maximum desired RPM ratio $e'$ max. If the compensated desired RPM ratio $e_c'$ is greater than the maximum desired RPM ratio $e'max$, then the program proceeds to the step 80, wherein the compensated desired RPM ratio $e_c'$ is set equal to the maximum desired RPM ratio $e'max$.

The program then proceeds to a step 82, wherein an amount of voltage needed to control the flow control valve 19 is calculated by using the equation $K(e'-e)$, where K is a constant and $e$ is the actual RPM ratio. The program then proceeds to a step 84, wherein the engine torque $T_e$ is calculated. The program then proceeds to a step 86. In the step 86, an amount of voltage needed to control the regulator valve 16 is calculated as a function of the engine torque $T_e$, the rotational speed of the driving pulley 6, $RPM_{in}$, and the rotational speed of the driven pulley 7, $RPM_{out}$.

Figure 5:
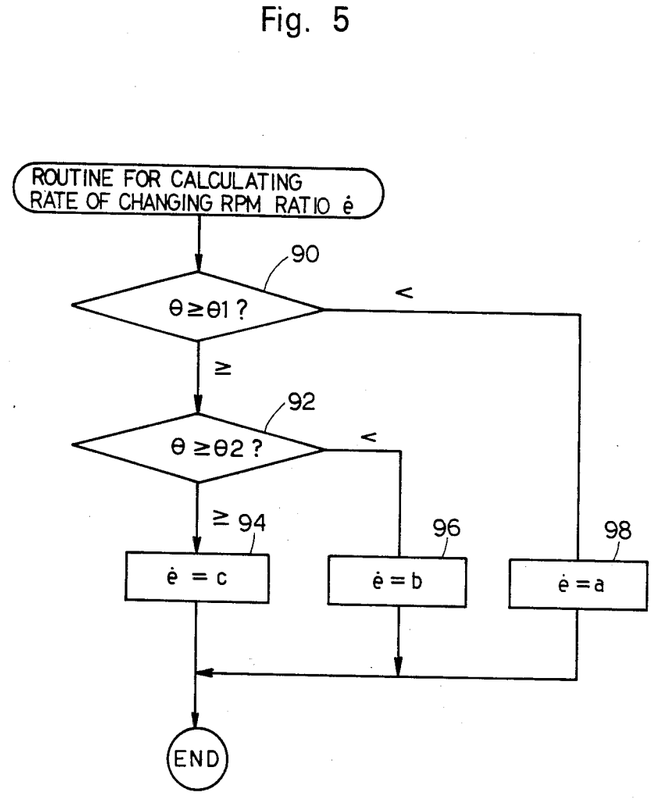
FIG. 5 is a flow chart which illustrates a routine for calculating a rate of changing a transmission RPM ratio utilized in FIGS. 3 and 4.
Figure 6:
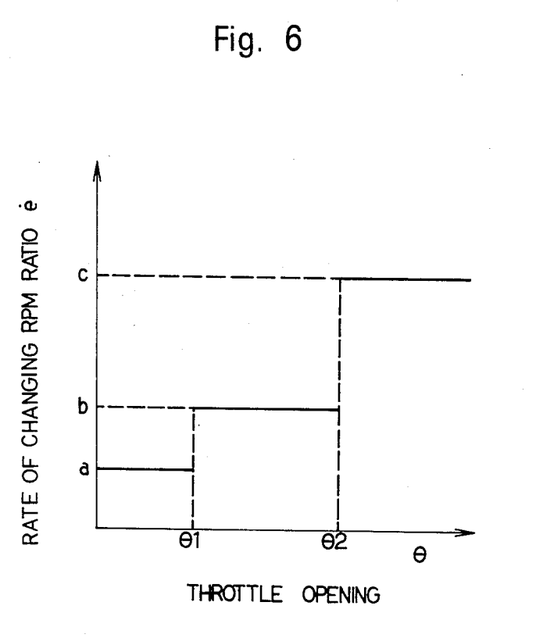
FIG. 6 is a graph showing the relationship between a throttle opening and a rate of changing a transmission RPM ratio, employed in the routine shown in FIG. 5.

FIG. 5 shows a flow chart which illustrates a routine for calculating a rate $\dot{e}$ of changing the RPM ratio which can be used in step 46 of FIG. 3 or in steps 72 and 76 in FIG. 4. The rate $\dot{e}$ of changing the RPM ratio is defined as $|de/dt|$, where "t" represents time. The rate $\dot{e}$ of changing the RPM ratio is dependent upon an amount $\theta$ that the throttle valve is opened and the greater the acceleration of the vehicle, the greater the throttle opening $\theta$. A second relationship between the amount of throttle opening $\theta_1$ and the rate $\dot{e}$ of changing the RPM ratio, is shown in FIG. 6. When the throttle valve is opened any amount less than $\theta_1$, the predetermined value "a" is chosen as the rate $\dot{e}$ for changing the RPM ratio. Additionally, when the throttle valve is opened any amount greater than or equal to $\theta_1$, but less than $\theta_2$, the predetermined value is chosen as the rate $\dot{e}$ for changing the RPM ratio and the predetermined amount "b" is greater than "a". Similarly, when the throttle valve is opened any amount greater than or equal to $\theta_2$, the predetermined value "c" is chosen as the rate $\dot{e}$ for changing the transmission RPM ratio, and the predetermined value "c" is greater than "b" and "a". Hence, the rate $\dot{e}$ of changing the transmission RPM ratio discontinuously increases from "a" to "b" at a throttle opening equal to $\theta_1$, and similarly discontinuously increases from "b" to "c" at a throttle opening equal to $\theta_2$. This method permits the use of three different rates $\dot{e}$ of changing the transmission RPM ratio. Accordingly, a higher value "c" is chosen when the accelerator pedal is displaced a large amount, resulting in a rapid transmission RPM ratio ė change, which is needed for rapid vehicle acceleration. A lower value "a" is chosen when the accelerator pedal is displaced a small amount corresponding to a slower acceleration or steady driving conditions, thereby providing for a high transmission efficiency.

FIG. 5 shows that in a step 90, the determination is made as to whether the throttle opening $\theta$ is greater than or equal to the predetermined throttle value $\theta_1$. When the throttle opening $\theta$ is less than the predetermined throttle value $\theta_1$, the program proceeds to a step 98, wherein the rate ė of changing the transmission RPM ratio is set equal to the predetermined value "a". When the throttle opening $\theta$ is greater than or equal to the predetermined throttle value $\theta_1$, the program proceeds to a step 92, wherein the determination is made of whether the throttle opening $\theta$ is greater than or equal to the predetermined value $\theta_2$. The predetermined value $\theta_2$ is determined to be larger than the predetermined value $\theta_1$. When the throttle opening $\theta$ is less than the predetermined value $\theta_2$, the program proceeds to a step 96, wherein the rate ė of changing the transmission RPM ratio is set equal to the predetermined value "b". When the throttle opening $\theta$ is greater than or equal to the predetermined value $\theta_2$, the program proceeds to a step 94, wherein the rate ė of changing the transmission ratio is set equal to the predetermined value "c". The values of "a", "b" and "c" satisfy the following inequality $a<b<c$.

Figure 7:
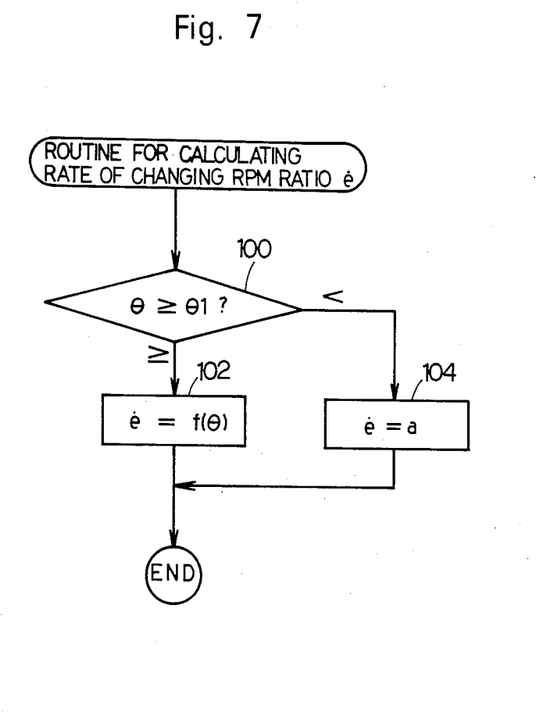
FIG. 7 is a flow chart which illustrates another routine for calculating a rate of changing a transmission RPM ratio utilized in FIGS. 3 and 4.

FIG. 7 discloses another flow chart for calculating a rate ė of changing a transmission RPM ratio according to a second embodiment which can also be used in step 46 of FIG. 3 or in steps 72 and 76 in FIG. 4. In a step 100, the determination is made of whether the throttle opening $\theta$ is greater than or equal to the predetermined throttle value $\theta_1$. When the throttle opening $\theta$ is less than the predetermined throttle value $\theta_1$, the program proceeds to a step 104, wherein the rate ė of changing the transmission RPM ratio is set equal to the predetermined value "a". However, when the throttle opening $\theta$ is greater than or equal to $\theta_1$, the program proceeds to a step 102, wherein the rate ė of changing the transmission RPM ratio is set equal to a particular value which is a function of the amount of throttle opening $\theta$. Two different functions of $\theta$ are disclosed in FIG. 8, $f'(\theta)$ and $f''(\theta)$. Hence, whenever the determination is made that $\theta$ is greater than or equal to $\theta_1$, the rate ė of changing the transmission RPM ratio varies along the linear path $f'(\theta)$ or along the curved path $f''(\theta)$ depending upon the particular design characteristics of the CVT 4.

Figure 9:
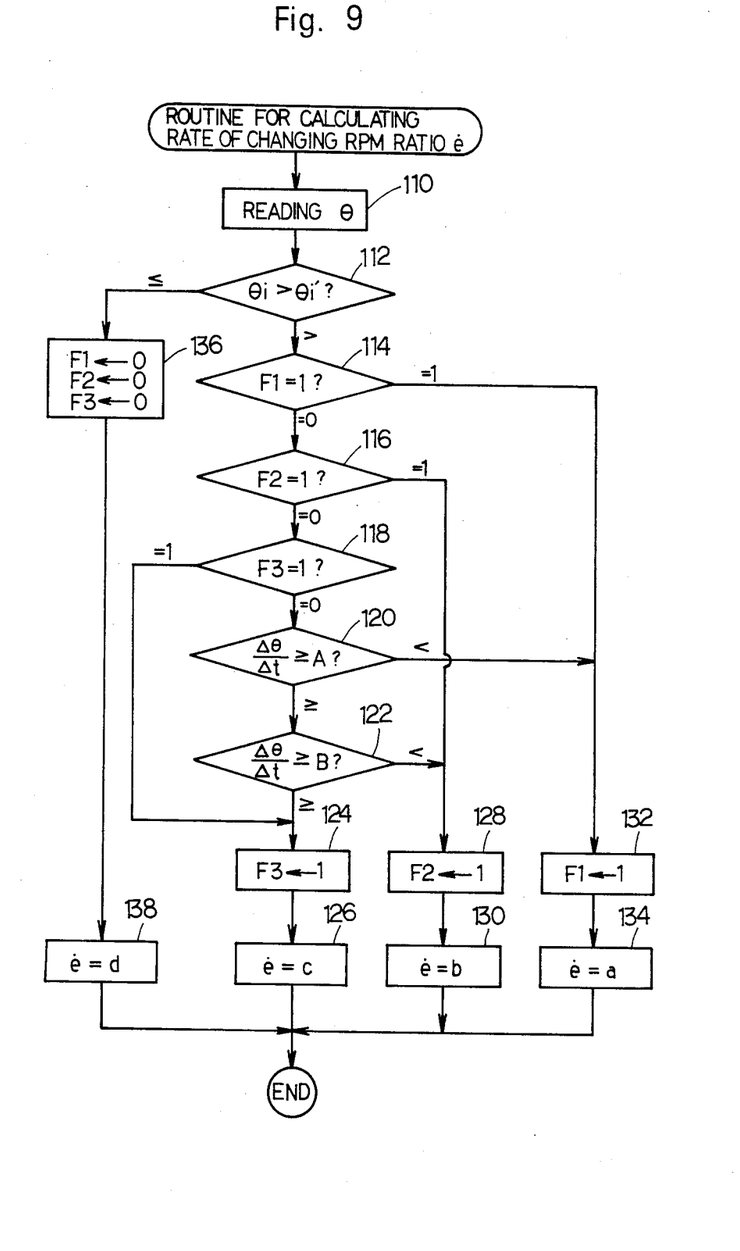
FIG. 9 is a flow chart which illustrates other routine for calculating a rate of changing a transmission RPM ratio.
Figure 10:
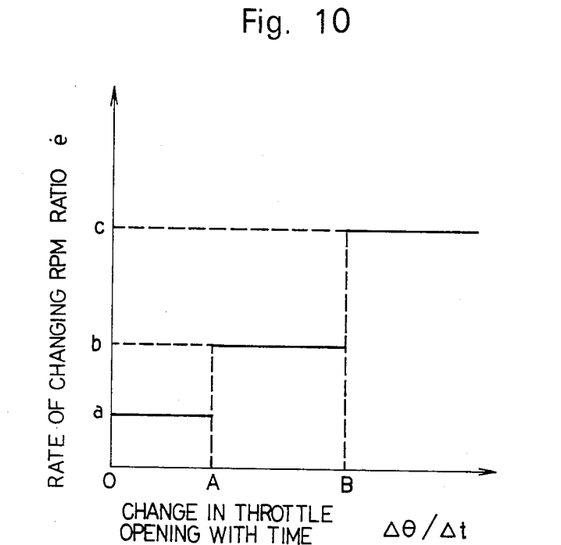
FIG. 10 is a graph showing a relationship between a rate of changing a throttle valve opening and a rate of changing a transmission RPM ratio employed in the routine shown in FIG. 9.

FIG. 9 discloses another flow chart for calculating a rate ė of changing a transmission RPM ratio, according to a third embodiment which can also be used in step 46 of FIG. 3 or in steps 72 and 76 in FIG. 4. The ratio $\Delta\theta/\Delta t$ referred to in FIGS. 9–11, corresponds to the expression $d\theta/dt$. The reference $\Delta\theta/\Delta t$ represents an amount of change in a throttle opening $\theta$ for a particular amount of time. FIG. 10 is substantially similar to FIG. 6 in effect, but differs from FIG. 6 in that the abscissa corresponds to a rate $\Delta\theta/\Delta t$ of changing throttle opening, as opposed to throttle opening $\theta$ in FIG. 6.

The flow chart shown in FIG. 9 functions as follows. In a step 110, the throttle opening $\theta$ is read. The program proceeds to a step 112, wherein the determination is made of whether the present throttle opening $\theta_i$ is greater than the previously detected throttle opening $\theta'_i$. When the present throttle opening $\theta_i$ is less than or equal to the previously calculated throttle opening $\theta'_i$, corresponding to a decreasing or non-changing throttle opening, respectively, the program proceeds to a step 136, wherein flags F1, F2 and F3 are reset to zero. The program then proceeds to a step 138, wherein the rate ė of changing the transmission RPM ratio is set equal to a predetermined value "d".

The rationale for utilizing flags in the step 136, as well as other steps, is to prevent the rate ė of changing the transmission RPM ratio from varying between sequential calculations. The rate ė of changing the transmission RPM ratio is set into the flags at the moment when the accelerator pedal is depressed. Hence, the ratio ė is maintained in the flags until the flags F1, F2 and F3 are reset. The flags are reset by a decreasing of the displacement of the accelerator pedal.

When the present throttle opening $\theta_i$ is greater than the previously detected throttle opening $\theta'_i$, corresponding to an increasing throttle opening, the program proceeds to a step 114. In the step 114 the determination is made of whether a flag F1 has or has not been set (i.e., F1=1 or F1=0). When the flag F1 has been set (i.e., F1=1), the program proceeds to a step 132, wherein the flag F1 is set to one. The program then proceeds to a step 134, wherein the rate ė of changing the transmission RPM ratio is set equal to the predetermined value "a". However, when the flag F1 has not been set (i.e., F1=0), the program proceeds to a step 116, wherein the determination is made of whether the flag F2 has or has not been set (i.e., F2=1 or F2=0). When the flag F2 has been set (i.e., F2=1), the program proceeds to a step 128, wherein the flag F2 is set to one. The program then proceeds to a step 130, wherein the rate ė of changing the transmission RPM ratio is set equal to the predetermined value "b". When the flag F2 has not been set (i.e., F2=0), the program proceeds to a step 118, wherein the determination is made of whether the flag F3 has not been set (i.e., F3=1 or F3=0). When the flag F3 has been set (i.e., F3=1), the program proceeds to a step 124, wherein the flag F3 is set to one. The program proceeds to a step 126, wherein the rate ė of changing the transmission RPM ratio is set equal to the predetermined value "c". When the flag F3 has not been set (i.e., F3=0), the program proceeds to a step 120. In the step 120, it is determined whether the rate $\Delta\theta/\Delta t$ of changing throttle opening is greater than or equal to "A". The reference "A" is a predetermined rate of change of the throttle opening as shown in FIG. 10. When the rate $\Delta\theta/\Delta t$ of changing throttle opening is less than "A", the program proceeds to the steps 132 and 134. However, when the rate $\Delta\theta/\Delta t$ of changing throttle opening is greater than or equal to "A", the program proceeds to a step 122. In the step 122, it is determined whether the rate $\Delta\theta/\Delta t$ of changing throttle opening is greater than or equal to "B". The reference B is also a predetermined rate of change of the throttle opening which is larger than "A", as shown by FIG. 10. When the rate $\Delta\theta/\Delta t$ of changing throttle opening is less than "B", the program proceeds to the steps 128 and 130. However, when the rate $\Delta\theta/\Delta t$ of changing throttle opening is greater than or equal to "B", the program proceeds to the steps 124 and 126, resulting in the rate ė of changing the transmission RPM ratio being set equal to the predetermined value "c". The predetermined values of "a", "b" and "c" satisfy the following inequality $a<b<c$.

Figure 8:
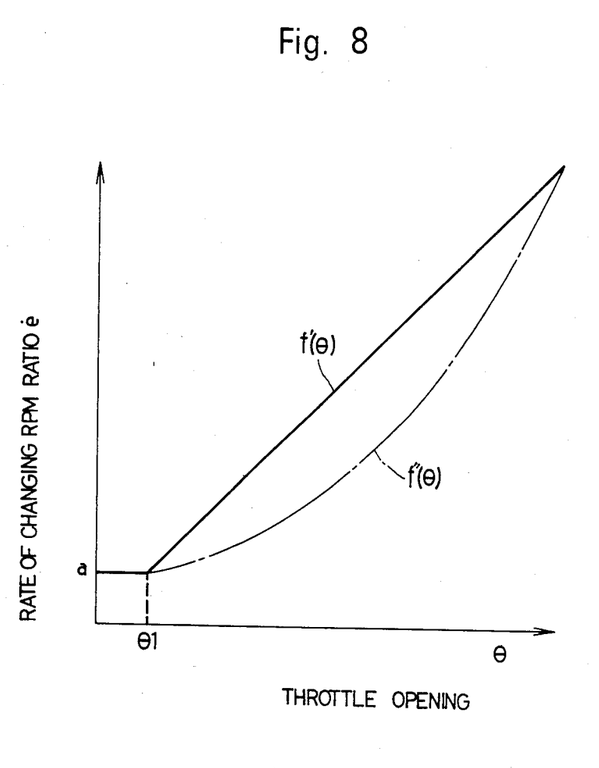
FIG. 8 is a graph which shows a relationship between a throttle opening, and a rate of changing a transmission RPM ratio, employed in the routine shown in FIG. 7.
Figure 11:
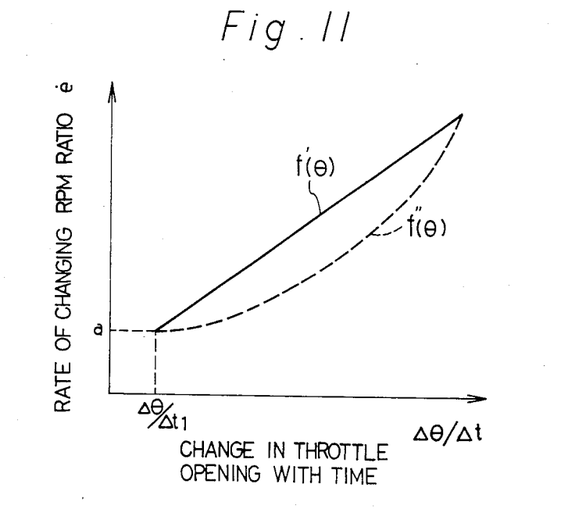
FIG. 11 is a graph which shows the another relationship between a rate of changing a throttle valve opening and a rate of changing a transmission RPM ratio employed in the routine shown in FIG. 9.

FIG. 11 is substantially similar to FIG. 8 in effect, but differs from FIG. 8 in that the abscissa corresponds to a rate $\Delta\theta/\Delta t$ of changing throttle opening, as opposed to throttle opening $\theta$ in FIG. 8. Hence, a particular value for the rate ė of changing the RPM ratio can be chosen from either the f'(θ) curve or the f''(θ) curve as a function of the rate Δθ/Δt of changing throttle opening. Choosing either f'(θ) or f''(θ) is dependent upon the particular design characteristics of the CVT 4.

While the present invention has been described in its preferred embodiments, it is to be understood that the invention is not limited thereto, and may be otherwise embodied within the scope of the following claims.

What is claimed is:

1. A method for controlling a continuously variable transmission which includes a driving pulley mounted on an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member and an endless belt member spanning the pulleys so that an effective diameter of the pulleys can be varied at different rates with regard to each other so that different speed ratios can be obtained, said method comprising the steps of:

(1) detecting first and second openings of a throttle valve, an actual rotational speed of the driving pulley and an actual rotational speed of the driven pulley, the second opening of the throttle valve being detected at a predetermined time period after the first throttle valve opening is detected;

(2) determining a desired power in accordance with the detected amount of the throttle valve;

(3) calculating a desired rotational speed of the driving pulley in accordance with a first stored relationship and the determined desired power, the desired rotational speed of the driving pulley being calculated to provide a minimum fuel consumption for the determined desired power;

(4) detecting whether a first flag, a second flag and a third flag are set;

(5) calculating a change in the detected throttle valve opening per unit time;

(6) comparing the calculated change in detected throttle valve opening per unit time with a first predetermined change in throttle valve opening per unit time and a second predetermined change in throttle valve opening per unit time;

(7) comparing the first detected throttle valve opening with the second detected throttle valve opening;

(8) determining a rate "ė" of changing RPM ratio in accordance with a result of comparison step (7), whereby:

(8-a) when the first detected throttle valve opening is equal to or greater than the second detected throttle valve opening, the rate "ė" is set equal to a first predetermined value "d", and (8-b) when the first detected throttle valve opening is less than the second detected throttle valve opening, the rate "ė" is determined in accordance with a result of detecting step (4), whereby:

(8-b-1) when the first flag is set, the rate "ė" is set equal to a second predetermined value "a", (8-b-2) when the first flag is not set and the second flag is set, the rate "ė" is set equal to a third predetermined value "b", (8-b-3) when the first flag and the second flag are not set and the third flag is set, the rate "ė" is set equal to a fourth predetermined value "c", (8-b-4) when the first flag, the second flag and the third flag are not set, the rate "ė" is determined in accordance with a result of comparison step (6), whereby:

(8-b-4) when the calculated change in throttle valve opening per unit time is less than the first predetermined change in throttle valve opening per unit time, the rate "ė" is set equal to the second predetermined value "a", (8-b-4-b) when the calculated change in throttle valve opening per unit time is equal to or greater than the first predetermined change in throttle valve opening per unit time and is less than the second predetermined change in throttle valve opening per unit time, the rate "ė" is set equal to the third predetermined value "b", and (8-b-4-c) when the calculated change in throttle valve opening per unit time is equal to or greater than the second predetermined change in throttle valve opening per unit time, the rate "ė" is set equal to the fourth predetermined value "c";

(9) calculating a value "Δe" in accordance with a result of the determined step (8);

(10) comparing the detected actual rotational speed of the driving pulley with the calculated desired rotational speed;

(11) selecting either a positive value "+Δe" or a negative value "−Δe" in accordance with a result of the comparison of step (10), whereby:

(11-a) when the detected value of the actual rotational speed of the driving pulley is less than the calculated desired rotational speed of the driving pulley, the negative value "−Δe" is selected, and (11-b) when the detected value of the actual rotational speed of the driving pulley is greater than the calculated desired rotational speed of the driving pulley, the positive value "+Δe" is selected;

(12) calculating an actual RPM ratio "e" from the values of the actual rotational speeds of the driving and driven pulleys;

(13) calculating a compensated desired RPM ratio "$e_c'$" by adding the selected value "+Δe" or "−Δe" to a desired RPM ratio "e'";

(14) determining a feedback value from a difference between the calculated compensated desired RPM ratio "$e_c'$" and the calculated actual RPM ratio "e"; and (15) controlling a flow control valve of the continuously variable transmission in accordance with the determined feedback value, whereby the actual RPM ratio "e" is controlled by the calculated feedback value.

2. The method of claim 1, wherein said selecting step selects zero when the detected actual rotational speed of the driving pulley is equal to the calculated desired rotational speed of the driving pulley.

3. The method of claim 2, further comprising the steps of:

(1) determining a torque from the detected actual rotational speed of the driving pulley and the detected opening of the throttle valve in accordance with the second stored relationship;
(2) calculating a line pressure as a function of the determined torque and the detected values of the actual rotational speeds of the driving and driven pulleys; and
(3) adjusting a regulator valve of the continuously variable transmission in accordance with the calculated line pressure, whereby the actual RPM ratio is also controlled by the calculated feedback value and the calculated line pressure.

4. The method of claim 3, further comprising the steps of:
comparing the compensated desired RPM ratio with a maximum ratio and a minimum RPM ratio; and
selecting one RPM ratio from the compensated desired RPM ratio, the maximum RPM ratio and the minimum RPM ratio, whereby:
(a) when the compensated desired RPM ratio is equal to or greater than the maximum RPM ratio, the maximum RPM ratio is selected,
(b) when the compensated desired RPM ratio is equal to or less than the minimum RPM ratio, the minimum RPM ratio is selected, and
(c) when the compensated desired RPM ratio is greater than the minimum RPM ratio and less than the maximum RPM ratio, the compensated desired RPM ratio is selected.

5. A method for controlling a rate "è" of changing a RPM ratio in a continuously variable transmission which includes a driving pulley mounted on an input shaft, the driving pulley comprising a fixed member and a movable member, the movable member being actuated by a hydraulic cylinder to form a V-shaped opening between the movable member and the fixed member, a driven pulley mounted on an output shaft, the driven pulley comprising another fixed member and another movable member, the another movable member being similarly actuated by another hydraulic cylinder supplied with a line pressure to form another V-shaped opening between said another movable member and said another fixed member and an endless belt member spanning the pulleys so that an effective diameter of the pulleys can be varied at different rates with regard to each other so that different speed ratios can be obtained, said method comprising the steps of:
(1) detecting first and second openings of a throttle valve, an actual rotational speed of the driving pulley and an actual rotational speed of the driven pulley, the second opening of the throttle valve being detected at a predetermined time period after the firt throttle valve opening is detected;
(2) detecting whether a first flag, a second flag and a third flag are set;
(3) calculating a change in the detected throttle valve opening per unit time;
(4) comparing the calculated change in detected throttle valve opening per unit time with a first predetermined change in throttle valve opening per unit time and a second predetermined change in throttle valve opening per unit time;
(5) comparing the first detected throttle valve opening with the second detected throttle valve opening; and
(6) determining the rate "è" in accordance with a result of comparison step (5), whereby:
(6-a) when the first detected throttle valve opening is equal to or greater than the second detected throttle valve opening, the rate "è" is set equal to a first predetermined value "d", and
(6-b) when the first detected throttle valve opening is less than the second detected throttle valve opening, the rate "è" is determined in accordance with a result of detecting step (2), whereby:
(6-b-1) when the first flag is set, the rate "è" is set equal to a second predetermined value "a",
(6-b-2) when the first flag is not set and the second flag is set, the rate "è" is set equal to a third predetermined value "b",
(6-b-3) when the first flag and the second flag are not set and the third flag is set, the rate "è" is set equal to a fourth predetermined value "c",
(6-b-4) when the first flag, the second flag and the third flag are not set, the rate "è" is determined in accordance with a result of comparison step (4), whereby:
(6-b-4-a) when the calculated change in throttle valve opening per unit time is less than the first predetermined change in throttle valve opening per unit time, the rate "è" is set equal to the second predetermined value "a",
(6-b-4-b) when the calculated change in throttle valve opening per unit time is equal to or greater than the first predetermined change in throttle valve opening per unit time and is less than the second predetermined change in throttle valve opening per unit time, the rate "è" is set equal to the third predetermined value "b", and
(6-b-4-c) when the calculated change in throttle valve opening per unit time is equal to or greater than the second predetermined change in throttle valve opening per unit time, the rate "è" is set equal to the fourth predetermined value "c".

* * * * *

UNITED STATES PATENT AND TRADEMARK OFFICE
CERTIFICATE OF CORRECTION

PATENT NO. : 4,727,771

DATED : March 1, 1988

INVENTOR(S) : T. NIWA et al.

It is certified that error appears in the above-identified patent and that said Letters Patent is hereby corrected as shown below:

On the Title Page

In the Title, Item [54], delete "CONTROLLIG A".

Signed and Sealed this

Twenty-sixth Day of July, 1988

Attest:

DONALD J. QUIGG

Attesting Officer     Commissioner of Patents and Trademarks